(12) United States Patent
Greidenweis

(10) Patent No.: US 8,919,408 B2
(45) Date of Patent: Dec. 30, 2014

(54) PRE-FIXING A LAMINATING MATERIAL ON A COMPONENT SURFACE

(75) Inventor: Michael Greidenweis, Spaichingen (DE)

(73) Assignee: Greidenweis Maschinenbau GmbH, Spaichingen (DE)

(*) Notice: Subject to any disclaimer, the term of this patent is extended or adjusted under 35 U.S.C. 154(b) by 208 days.

(21) Appl. No.: 13/477,432

(22) Filed: May 22, 2012

(65) Prior Publication Data

US 2012/0298290 A1 Nov. 29, 2012

(30) Foreign Application Priority Data

May 24, 2011 (DE) .................. 10 2011 102 995

(51) Int. Cl.
*B32B 37/10* (2006.01)
*B29C 63/00* (2006.01)
*B32B 37/00* (2006.01)
*B29C 63/02* (2006.01)
*B29L 31/30* (2006.01)
*B32B 37/12* (2006.01)

(52) U.S. Cl.
CPC ......... *B29C 63/0004* (2013.01); *B32B 37/0046* (2013.01); *B32B 37/10* (2013.01); *B29C 63/02* (2013.01); *B32B 2605/003* (2013.01); *B29L 2031/3005* (2013.01); *B32B 37/0076* (2013.01); *B32B 37/1207* (2013.01)
USPC ............................ 156/494; 156/229; 156/580

(58) Field of Classification Search
USPC .......................................... 156/229, 580, 494
See application file for complete search history.

(56) References Cited

U.S. PATENT DOCUMENTS 5,435,883 A * 7/1995 Myers .................. 156/583.9
6,210,509 B1 * 4/2001 Sommerfeldt et al. ....... 156/152
7,267,154 B1 * 9/2007 Hung .................. 156/497

FOREIGN PATENT DOCUMENTS

DE 203 05 417 U1 7/2003
DE 10 2005 003 212 A1 8/2006
DE 10 2006 003 423 A1 8/2007

OTHER PUBLICATIONS

FRIMO Freilassing GmbH: Technologien für Oberflächen aus Leder/Kunstleder. 83395 Freilassing, (Germany) May 2009.—Firmenschrift, (English Translation: Technologies for Surfaces of leather / leather. 83395 Freilassing, May 2009.—Company magazine).

* cited by examiner

*Primary Examiner* — Linda L Gray
(74) *Attorney, Agent, or Firm* — Muirhead and Saturnelli, LLC

(57) ABSTRACT

A method and a device are provided for pre-fixing a laminating material to at least one surface portion of a component, in particular an interior lining component for a motor vehicle, which is arranged on a component receptacle 5. Here, a seam blade which can be acted on with different contact pressures is, by means of a pivoting movement from a position arranged offset from the component receptacle, applied with a pivoting movement to the laminating material placed onto and aligned on the component.

9 Claims, 3 Drawing Sheets

PRE-FIXING A LAMINATING MATERIAL ON A COMPONENT SURFACE

TECHNICAL FIELD

This application relates to a method for pre-fixing a laminating material on at least one surface portion of a component surface, in particular of an interior lining component for a motor vehicle, and to a device for pre-fixing a laminating material to the at least one surface portion of the component.

BACKGROUND OF THE INVENTION

Interior lining components for motor vehicles are nowadays generally produced from plastic and often have a multi-layered structure composed of at least one support component and one surface layer. These are generally injection-molded plastic components in which molded skins, fabrics, textile materials, leather or artificial leather are used as a surface layer or decorative layer. For this purpose, the laminating material may be placed into a production die and back-molded there with a molten plastics material. In particular in the case of instrument panels, it is conventional for the plastic support and the decorative material to be prefabricated in a preceding working step before then being placed together into a foaming die and back-foamed with a plastic to be foamed thereon, or connected to one another.

A disadvantage of said method is that the plastics material is processed in the molten state, such that the laminating material is subject to intense thermal loading. This can adversely affect the haptic and visual characteristics of the surface layer.

As an alternative to the above-mentioned methods, therefore, in particular in the case of sensitive materials, the so-called laminating technique has been used for many years. Here, firstly, the component is produced in a separate working step, and the surface of the component or a surface portion of the component is subsequently laminated with a laminating material. Here, firstly the rear side of the laminating material or the component surface is treated with a suitable adhesive system. The laminating material is subsequently applied and fixed to the surface or at least one partial region of the surface of the pre-manufactured component.

Laminating processes of said type are described for example in DE 2 925 500 A1, in DE 10 2007 040 879 A1 and in DE 10 2005 042 819 A1.

A disadvantage of the known methods is that, in particular in the case of components of complex shape, the alignment of the laminating material is often associated with problems. Since the alignment of the laminating material on the component surface is generally performed by hand, said method is, per se, already relatively work-intensive. In addition to this, there is the fact that manual work introduces additional sources of defects, in particular when the laminating material must be adapted to special shape contours of the component or if certain positions on the component surface are provided for example for seams in the laminating material. Here, there is always the risk that the haptic and visual impression of the laminated region is adversely affected as a result of slippage of the laminating material.

Accordingly, it would be desirable to specify a method and a device which have advantages over the prior art.

SUMMARY OF THE INVENTION

According to the system described herein, during the pre-fixing of a laminating material on at least one surface portion of a component arranged on a component receptacle, the position of the laminating material is secured and an undesired displacement of the laminating material on the component surface is prevented. Here, in a first step, the laminating material, which has been cut to size, is placed and roughly aligned on the at least one surface portion, which is to be laminated, of the component. In said method step, a non-activated adhesive layer is already provided between the laminating material and the component surface, which adhesive layer is applied either to the component surface or to the rear side of the laminating material.

In a second step, a seam blade is applied to the laminating material and the laminating material is pressed with a low contact pressure by means of the seam blade such that a displacement of the laminating material remains possible.

In a third step, the precise alignment of the laminating material is performed by hand. Subsequently, the laminating material is stretched by increasing the contact pressure of the seam blade, and in a final step, the pre-fixing of the laminating material is carried out by forming an adherent connection between the laminating material and the component surface through activation of the adhesive layer.

The advantage over the prior art consists substantially in that, in the first method step, the seam blade is arranged offset from the component receptacle during the placing and rough alignment of the laminating material which has been cut to size, and only in the second step is said seam blade applied, with a pivoting movement by means of a pivot arm likewise offset from the component receptacle, to the laminating material lying on the surface portion. In this way, the region above the component receptacle is freely accessible for the placing, rough alignment and precise alignment of the laminating material, as a result of which these activities are made significantly easier.

A further advantage over the prior art consists in that the seam blade can be acted on with different levels of pressure, such that the laminating material is pressed lightly onto the component surface for the precise alignment, wherein a targeted displacement of the laminating material remains possible, whereas undesired slippage of the laminating material is made impossible or is at least hindered. At a second level of pressure, the precisely aligned laminating material is stretched under elevated pressure, before subsequently being pre-fixed through the formation of an adherent connection between the laminating material and the component surface.

As laminating material, use may be made of the materials which are common in particular for interior lining components for motor vehicles, from the group comprising leather, plastic foil, fabric, textile and artificial leather, wherein laminating materials which have a seam or are seamless may be used in the method according to the invention.

The activation of the adhesive layer is realized, in an advantageous embodiment of the system described herein, through the supply of heat, wherein as an adhesive layer, a heat-activatable adhesive is provided which, before the laminating material is placed on the at least one surface portion of the surface of the component, is applied either to the surface of the component or to the rear side of the laminating material.

The system described herein also relates to a device for pre-fixing a laminating material to at least one surface portion of a component, in particular an interior lining component for a motor vehicle, which is arranged on a component receptacle. The device according to the invention comprises a component receptacle which is arranged on a base plate, a seam blade which can be acted on with pressure, and means for applying the seam blade to the laminating material lying on the component.

The means for applying the seam blade to the laminating material lying on the component comprise a pivot arm on which the seam blade is arranged, wherein the seam blade, which can be acted on with different levels of pressure, is applied with a pivoting movement to the laminating material lying on the component.

The means for applying the seam blade to the laminating material additionally comprise a stand on which the pivot arm is arranged pivotably by means of a bearing shaft which is mounted in a bearing arrangement.

In an embodiment of the system described herein, the means for applying the seam blade to the laminating material furthermore comprise a pivot cylinder which is arranged on a holder connected to the base plate via a jib and which is operatively connected to the pivot arm.

An embodiment of the system described herein provides that means for stretching the laminating material are provided on the holder, which means comprise a stretching cylinder and a stretching arm, wherein the stretching cylinder and the stretching arm are operatively connected to or enter into operative connection with the seam blade during the stretching of the laminating material. The activation of the means for stretching the laminating material is advantageously performed by means of a switching handle which is arranged in an easily accessible manner on the seam blade.

BRIEF DESCRIPTION OF THE DRAWINGS

Embodiments of the system described herein will be explained in more detail below on the basis of corresponding drawings, in which.

DETAILED DESCRIPTION OF VARIOUS EMBODIMENTS

Figure 1:
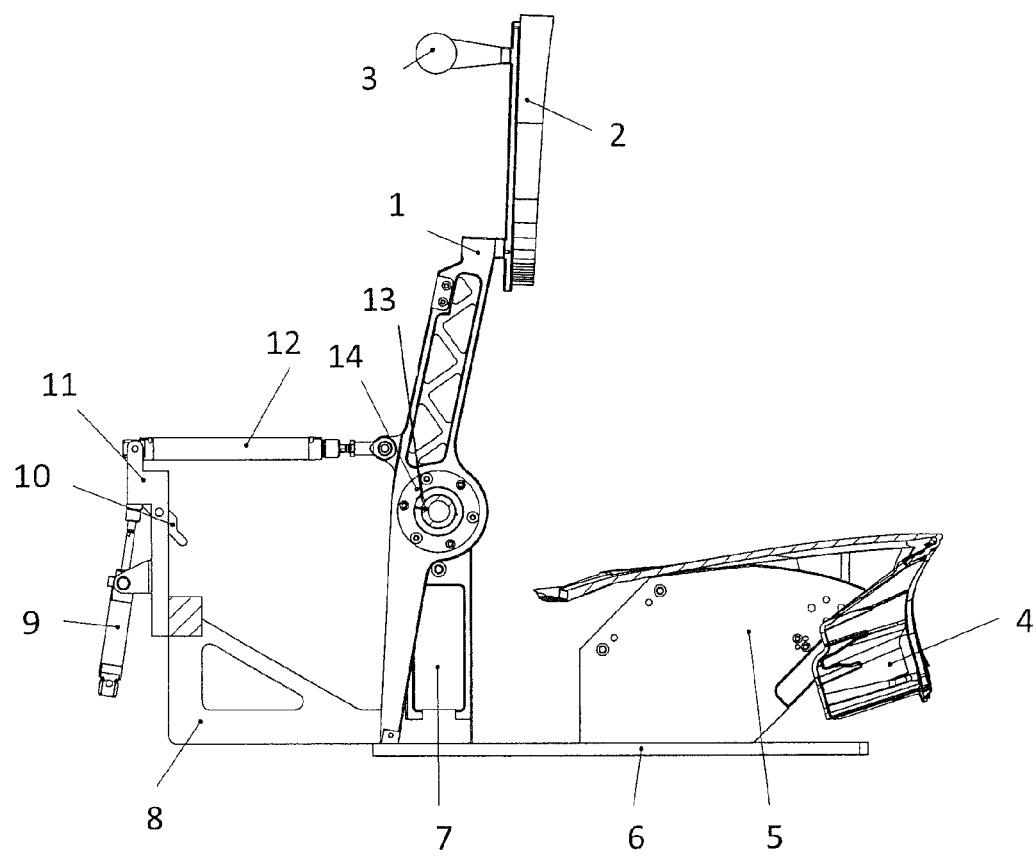
FIGS. 1 to 3 show, in the same view in each case, the device according to the system described herein at different times during the method according to the system described herein.

FIG. 1 shows the device for pre-fixing a laminating material in a side view, wherein a component 4 is arranged on a component receptacle 5, which in turn is fastened to a base plate 6. Likewise positioned on the base plate, offset from the component receptacle 5, is a stand 7 on which a pivot arm 1 is pivotably mounted by means of a bearing arrangement 14 and a bearing shaft 13. At the top end of the pivot arm 1 there is arranged a seam blade 2 with a switching handle 3. The pivoting movement of the pivot arm 1 is realized by means of a pivot cylinder 12 which is arranged on a holder 11 which is connected to the base plate 6 via a jib 8. Also provided on the holder 11 is a stretching cylinder 9 and a stretching arm 8, the functioning of which will be explained in more detail in FIG. 3. The state illustrated in FIG. 1 corresponds to the first method step, in which the seam blade 2 is arranged offset from the component receptacle 5, such that the component 4 is freely accessible and the laminating material can easily be placed and roughly aligned on the at least one surface portion of the component which is to be laminated.

Figure 2:
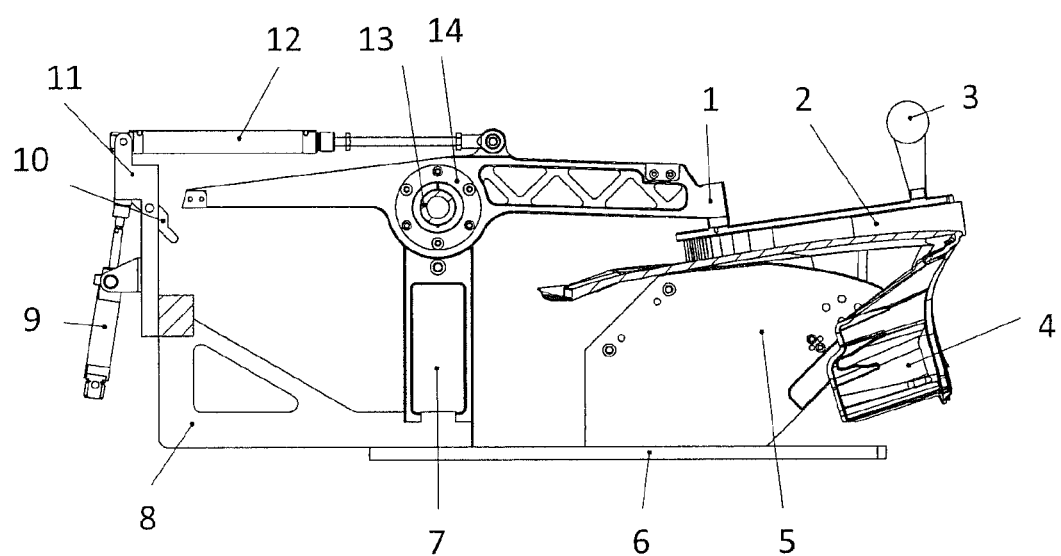

FIG. 2 shows the next method step, in which the seam blade 2 arranged on the pivot arm 1 is applied with low pressure to the laminating material by means of the pivot cylinder 12. Here, the pivot arm 1 pivots with the bearing arrangement 14 about the bearing shaft 13. As a result of the pivoting movement, the rearward projection of the pivot arm 1 is moved from its original position on the base plate 6 into a position in the vicinity of the holder 11. In this method step, the pressure with which the seam blade 2 is applied is low enough that, in this situation, a displacement and therefore a precise alignment of the laminating material is possible.

Figure 3:
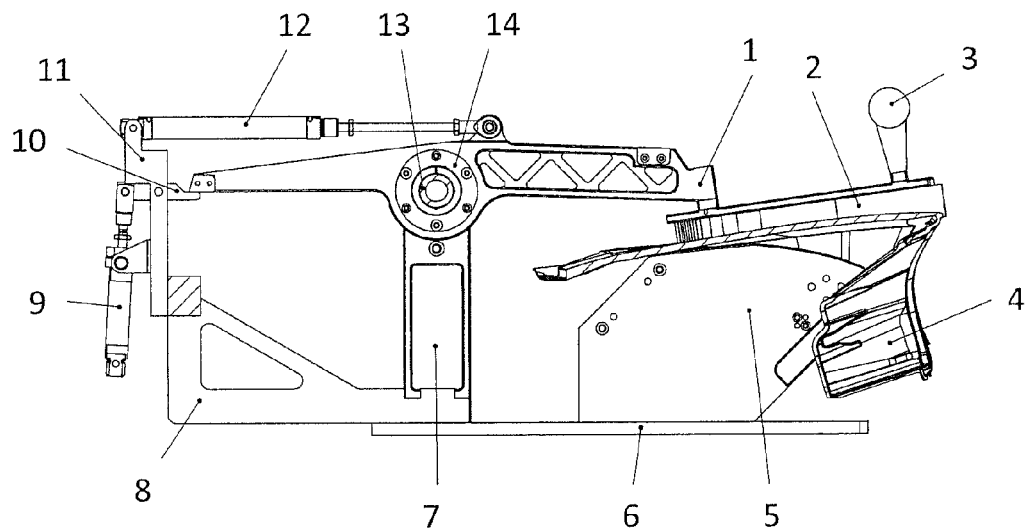

FIG. 3 illustrates the stretching of the laminating material on the surface portion, which is to be laminated, of the component, wherein the stretching arm 10 is pressed from below against the rearward jib of the pivot arm 1 by means of the stretching cylinder 9 and pushes said jib upwards, such that the seam blade 2 arranged on the opposite side of the pivot arm fixes the laminating material on the component 4 under elevated contact pressure.

In said position, the pre-fixing of the laminating material can now be ended though the formation of an adherent connection between the laminating material and the component surface. Here, it is advantageously the case that an adhesive layer which has already been applied before the first method step either to the component surface to be laminated or to the rear side of the laminating material is activated. As an adhesive layer there is preferably applied a so-called hot melt or a water-soluble dispersion, the adhesive action of which is first activated through the application of heat, which in the present case may be realized for example by means of a blow dryer. The laminating material is subsequently pre-fixed on the component surface, and the component can subsequently be finished in the actual lamination step. Any other suitable heat treatment may also be used for activating the adhesive layer.

In all three figures, it can be seen that the base plate 6 and those parts of the device according to the invention which are denoted by the reference numerals 7 to 14 are connected to one another to form a structural unit which, in a preferred embodiment of the present invention, is designed as a whole to be pivotally adjustable and adjustable in height.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

The invention claimed is:

1. A device for pre-fixing a laminating material to at least one surface portion of a component which is arranged on a component receptacle, the device comprising:
    a component receptacle arranged on a base plate;
    a seam blade which can be acted on with pressure;
    an application mechanism that applies the seam blade to the laminating material lying on the component, wherein the application mechanism includes a pivot arm which is arranged offset from the component receptacle and on which the seam blade is arranged, wherein the seam blade can be applied with a pivoting movement to the laminating material lying on the component and can be acted on with different levels of pressure; and
    a stretching mechanism that stretches the laminating material on a holder, wherein the stretching mechanism includes a stretching cylinder and a stretching arm, wherein the stretching cylinder and the stretching arm are operatively connected to the seam blade during the stretching of the laminating material.

2. The device according to claim 1, wherein the application mechanism includes a stand which is arranged, offset from the component receptacle, on the base plate, wherein the pivot arm is arranged pivotably on the stand using a bearing shaft mounted in a bearing arrangement.

3. The device according to claim 1, wherein the application mechanism includes a pivot cylinder which is arranged on a holder which is connected to the base plate via a jib, wherein the pivot cylinder is operatively connected to the pivot arm.

4. The device according to claim 1, further comprising:
a switching handle that activates the stretching mechanism and is provided on the seam blade.

5. The device according to claim 1, wherein the base plate and at least the stretching cylinder and the stretching arm are connected to one another to form a structural unit, wherein the structural unit is pivotally adjustable and adjustable in height.

6. The device according to claim 1, wherein the component is an interior lining component for a motor vehicle.

7. A device for pre-fixing a laminating material to at least one surface portion of a component which is arranged on a component receptacle, the device comprising:
- a component receptacle arranged on a base plate;
- a seam blade which can be acted on with pressure;
- an application mechanism that applies the seam blade to the laminating material lying on the component, wherein the application mechanism includes a pivot arm which is arranged offset from the component receptacle and on which the seam blade is arranged, wherein the seam blade can be applied with a pivoting movement to the laminating material lying on the component and can be acted on with different levels of pressure;
- a stand which is arranged, offset from the component receptacle, on the base plate, wherein the pivot arm is arranged pivotably on the stand using a bearing shaft mounted in a bearing arrangement;
- a pivot cylinder which is arranged on a holder which is connected to the base plate via a jib, wherein the pivot cylinder is operatively connected to the pivot arm; and
- a stretching mechanism that stretches the laminating material on the holder, wherein the stretching mechanism includes a stretching cylinder and a stretching arm, wherein the stretching cylinder and the stretching arm are operatively connected to the seam blade during the stretching of the laminating material, wherein the base plate, the stand, the jib, the stretching cylinder, the stretching arm, the holder, the pivot cylinder, the bearing shaft and the bearing arrangement are connected to one another to form a structural unit, wherein the structural unit is pivotally adjustable and adjustable in height.

8. The device according to claim 7, further comprising:
a switching handle that activates the stretching mechanism and is provided on the seam blade.

9. The device according to claim 7, wherein the component is an interior lining component for a motor vehicle.

\* \* \* \* \*